Oct. 4, 1938.  W. H. BISHOP  2,132,228
OPENING ROOF FOR VEHICLE BODIES
Filed Oct. 21, 1933  4 Sheets-Sheet 1

INVENTOR,
William Henry Bishop.
By Andrew Wilson
His Attorney.

Oct. 4, 1938. W. H. BISHOP 2,132,228
OPENING ROOF FOR VEHICLE BODIES
Filed Oct. 21, 1933 4 Sheets-Sheet 2
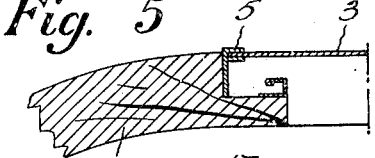
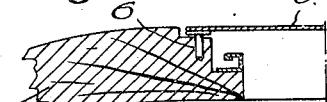
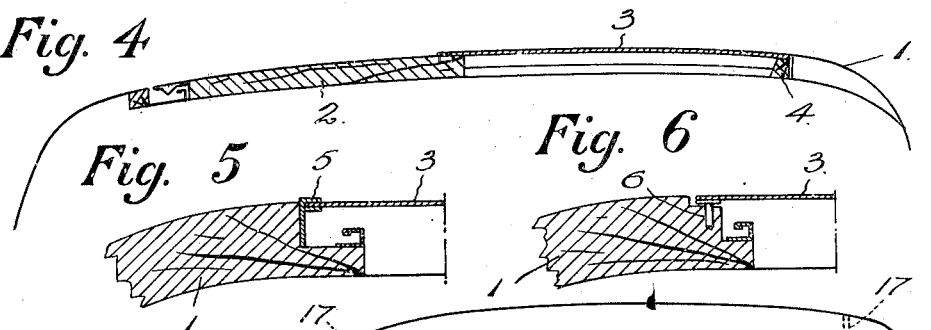
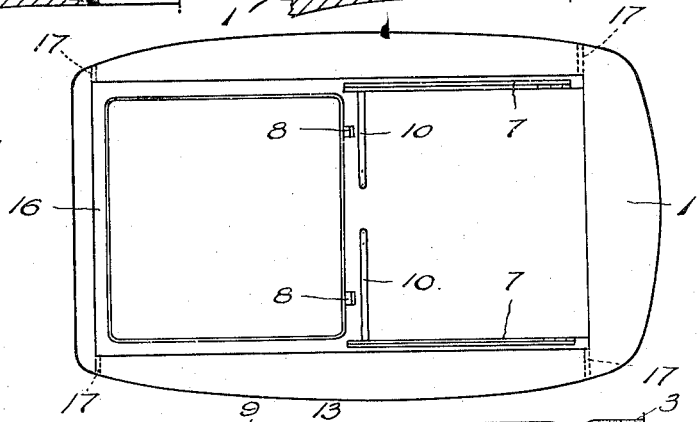
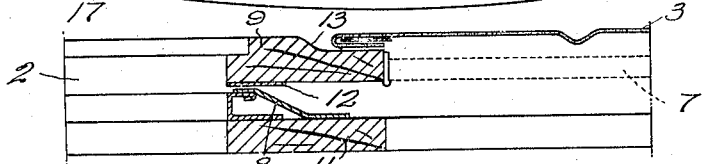
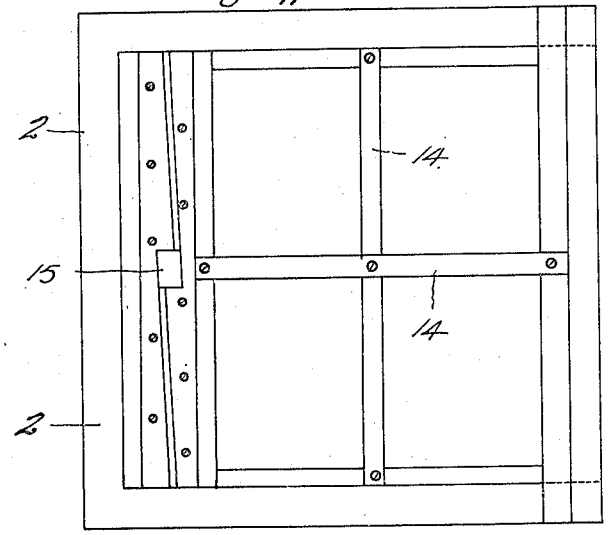
INVENTOR,
William Henry Bishop.
By Andrew Wilson.
his Attorney.

Oct. 4, 1938.  W. H. BISHOP  2,132,228
OPENING ROOF FOR VEHICLE BODIES
Filed Oct. 21, 1933    4 Sheets-Sheet 3

INVENTOR.
William Henry Bishop.
By Andrew Wilson
his attorney.

Oct. 4, 1938.   W. H. BISHOP   2,132,228
OPENING ROOF FOR VEHICLE BODIES
Filed Oct. 21, 1933   4 Sheets-Sheet 4
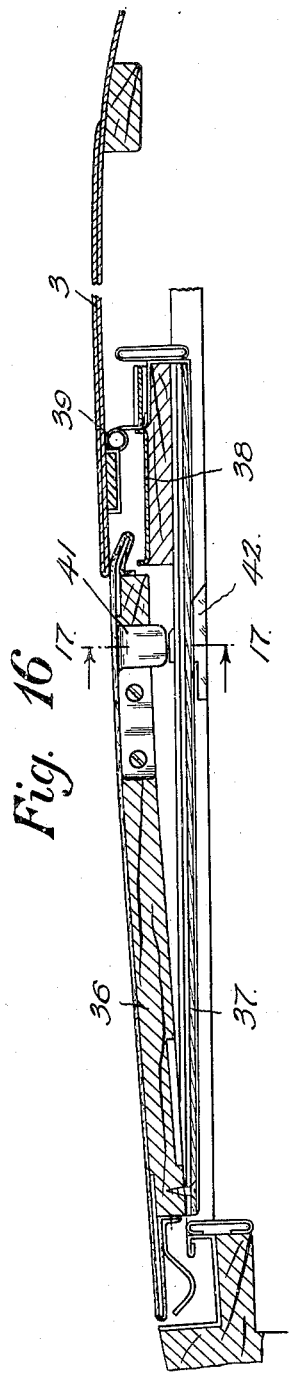
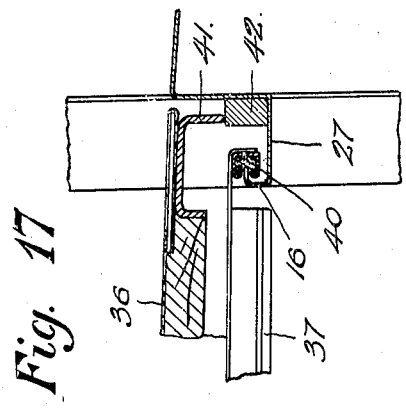
INVENTOR.
William Henry Bishop.

Patented Oct. 4, 1938

2,132,228

UNITED STATES PATENT OFFICE 2,132,228

OPENING ROOF FOR VEHICLE BODIES

William Henry Bishop, Birmingham, England, assignor to Weathershields Limited, Birmingham, England Application October 21, 1933, Serial No. 694,566
In Great Britain October 25, 1932

3 Claims. (Cl. 296—137)

This invention relates to improvements in opening roofs for vehicle bodies.

It is common practice to provide in the front part of the roof of a saloon car body an opening fitted with a panel or cover which can be slid rearwardly to uncover the opening, the panel when moved rearwardly sliding into a well or recess in the upper surface of the rear part of the roof or into a space between the canopy or outer covering over the rear part of the roof and the head lining.

The object of my invention is to provide an improved construction for such roofs in which the rear edge of the panel is automatically brought up flush with the fixed rear part of the roof as the panel reaches the fully closed position and is guided under the fixed rear part as the panel moves rearwardly, and in which the available head room in the rear part of the body is substantially increased, which is a great advantage with the modern body in which the overall height is kept low.

Further objects are to permit an opening to be uncovered in the rear part of the roof if desired or a partial opening to be provided at both the front and rear; to facilitate the exit of passengers from the vehicle in the event of the vehicle over-turning or being involved in an accident of such a nature as to prevent the doors being opened; and to ensure the sliding panel being securely held at all times so that there is no risk of rattle developing.

According to my invention the sliding panel for an opening in the front part of a vehicle roof is adapted to slide rearwardly under a canopy or cover for the rear part of the roof flush with the upper surface of the roof and the under surface of the canopy is trimmed or finished to match the interior finish of the remainder of the roof so that the usual head lining secured to the underside of the cross-members of the roof can be omitted and the effective head room is increased by an amount equal to the depth of the cross-members. The canopy or cover under which the panel slides may be fixed or may be slidably mounted in longitudinal guides so that it can be slid forwardly over the panel to uncover an opening over the rear passengers, or it may be detachably held in place by pegs or hinged to the roof along one edge so that it can readily be forced off or swung up to provide an exit for the passengers in case of emergency.

When the sliding panel is closed its rear edge is flush with the surface of the rear cover or canopy, being brought up into this position by inclined ramps or equivalent means. As the panel opens it is adapted to slide under the rear cover or canopy and for this purpose the guides in which it travels may be resiliently mounted or may have sufficient clearance to allow the panel to drop and slide under the cover when its rear edge rides down off the ramps. Where the sliding panel fits when closed over an upstanding flange or water-check frame around the opening in the roof slots or grooves may be provided in the front cross-member of the panel in line with the side flanges so that after the front edge of the panel has cleared the front flange the panel can drop into a horizontal position in which it will slide freely under the rear cover or canopy.

Some practical forms of my invention are illustrated diagrammatically by way of example in the accompanying drawings in which:—

Figure 4 is a longitudinal section of a roof showing the extra head-room available in the rear compartment.

Figures 5 and 6 are fragmentary sections showing two different methods of mounting the rear cover or canopy.

Figure 7 is a plan of a vehicle roof with the sliding panel and rear cover removed.

Figure 8 is a section on an enlarged scale through the rear edge of the sliding panel with the panel in the closed position.

Figure 9 is a plan of a sliding panel with the covering removed.

Figure 16 is a longitudinal section of a roof showing a modified arrangement for the sliding panel.

Figure 17 is a fragmentary transverse section of one side edge of the panel on the line 17—17 of Figure 16.

Figure 1:
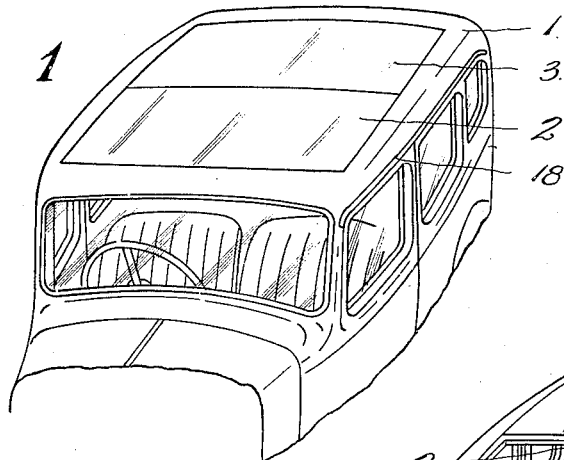
Figures 1, 2 and 3 are perspective views of a vehicle roof showing respectively the roof closed, the sliding panel open, and the sliding panel closed with the rear cover or canopy removed.
Figure 2:
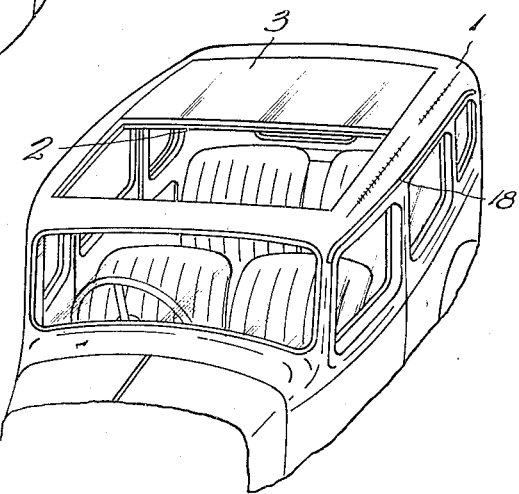
Figure 3:
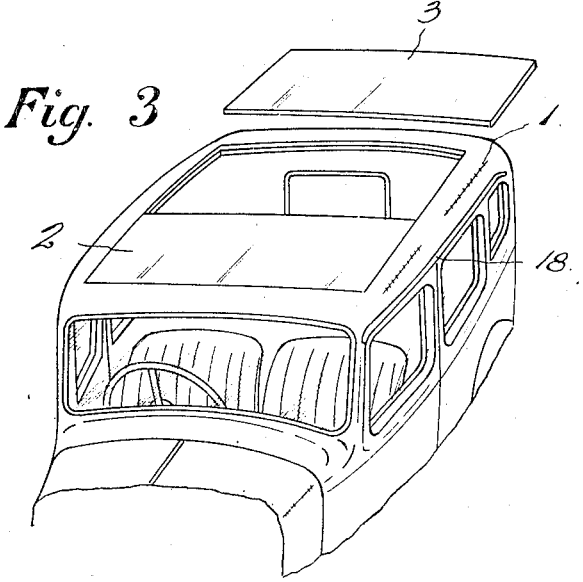

In Figures 1, 2 and 3, 1 is a vehicle roof in which is a longitudinal rectangular opening, and the front half of the opening is closed by a longitudinally slidable panel 2 while the rear half is closed by a sheet metal or other cover or canopy 3 under which the panel 2 is adapted to slide. The cover 3 is flush with the upper surface of the roof, and the panel 2 when closed is also flush so that the roof presents a smooth and unbroken surface as shown in Figure 1. The panel 2 when opened slides under the cover 3 and leaves the front half of the roof uncovered as shown in Figure 2, and the cover 3 may be made detachable so that it can be forced off to provide an exit for the passengers in case of accident as shown in Figure 3. The under surface of the cover 3 is trimmed or finished to match the interior finish of the remainder of the roof and the usual head lining secured to the underside of the cross-members of the roof is omitted, so that there is available under the cover 3 an additional amount of head-room equal to the depth of the cross-members as will be obvious from Figure 4 where the rear cross-member is shown at 4.

The cover 3 may be slidably mounted in guides 5 at the sides of the roof opening as shown in Figure 5 so that it can be slid forwardly over the panel 2 to uncover an opening over the rear passengers, the panel being first moved rearwardly a short distance to bring it into a horizontal position for the cover to slide over it. By suitable movements of the panel and cover both the front and rear of the vehicle can be partially uncovered, the panel and cover overlapping at the centre of the opening. Alternatively the cover 3 may be frictionally held in place by pegs 6 entering sockets in the roof at each side of the opening as shown in Figure 6 so that the cover can be quickly forced off in case of emergency.

To allow the rear edge of the panel 2 to drop from the flush position and slide under the cover 3 the panel in the construction illustrated in Figures 7 and 8 is slidably guided at each side in guides 7 extending under the cover 3 and these guides are securely held at their rear ends but are free at their front ends which can move upwardly against the resilience of the guides themselves with or without auxiliary spring means, and inclined ramps 8 located at convenient points are adapted to be engaged by the rear cross member 9 of the sliding panel 2 as the panel reaches the closed position to raise the rear edge of the panel into a position flush with the front edge of the cover 3 as shown in Figure 8. This rising movement of the panel also raises the front ends of the guides 7 which tend to press the panel down so that as the panel is moved rearwardly to open it and the rear edge of the panel rides off the ramps 8 the guides press it downwardly and allow it to slide freely under the cover 3. Preferably the resilience of the guides 7 is augmented by spring steel strips 10 arranged transversely on the roof and each secured at one end to a guide and at the other end to the roof.

The ramps 8 are conveniently made of sheet metal and are secured to a cross-member 11 of the roof structure, and a bearer strip 12 is secured to the underside of the rear cross-member 9 of the panel to engage with the ramps. Preferably the upper face of the cross-member 9 is stepped as shown at 13 in Figure 8 so that its rear part may fit under the front edge of the cover 3 while the remainder is flush with the upper surface of the cover 3.

The panel 2 is conveniently made up as shown in Figure 9 from a skeleton rectangular wooden frame strengthened with sheet metal strips 14 and a locking device 15 is arranged at the front of the panel and operated by a central control.

The opening in the roof is surrounded by a water-check frame having an outwardly directed flanged strip 16 which forms a guide for the panel 2 at the sides of the opening and over which the panel fits when closed to make a weather-tight closure. The space around the water-check frame is connected by openings 17 with gutters 18 (Figures 1, 7 and 13) so that water finding its way under the edges of the panel will drain to the outside of the body and cannot find its way into the vehicle.

Figure 10:
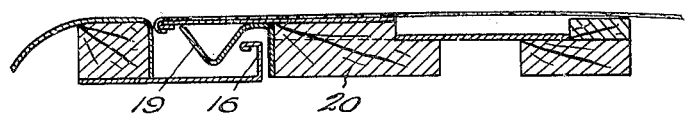
Figure 10 is a vertical section through the front of the sliding panel in the closed position.

Figure 10 shows the provision on the front of the panel 2 of a ramp 19 to raise the front edge of the panel over the flanged strip 16 as the panel reaches the closed position or starts to move rearwardly from the closed position, and slots 20, shown in dotted lines, are preferably provided in the front cross-member 21 of the panel in line with the side flanged strips so that after the front edge of the panel has cleared the front flanged strip the panel can drop into a horizontal position and slide freely under the cover 3.

Figure 11:
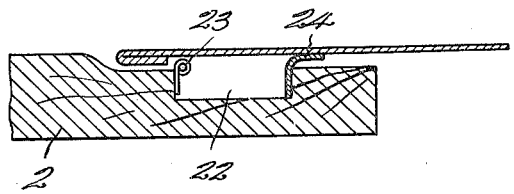
Figure 11 is a similar section through the rear edge of the panel.

One method of making a watertight joint between the rear edge of the panel when closed and the front of the cover 3 is shown in Figure 11. A transverse groove 22 is formed in the rear cross-member of the panel and on the front edge of this groove is secured an upstanding beaded packing strip 23 adapted to bear on the underside of the cover 3. A flexible rubber strip 24 is secured to the rear edge of the groove and projects upwardly for a substantial distance so that it will be flexed over and will make a watertight joint with the panel 3 as shown.

Figure 12:
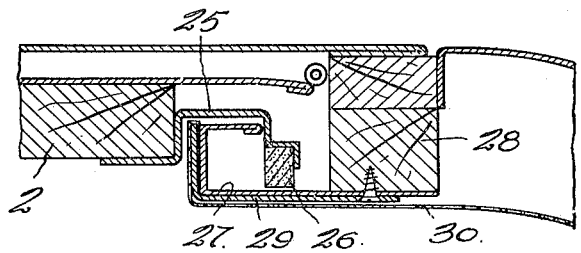
Figure 12 is a transverse section through one side edge of the panel showing the guide and fixed cantrail.

Figure 12 shows an alternative method of mounting the panel 2 at its sides. In this case the panel has secured to its underside stepped sheet metal lugs 25 carrying felt runners 26 adapted to run in the grooves in the water-check frame 27 outside the flanged strips 16. The water-check frame 27 is secured to the underside of fixed cantrails 28 at each side of the roof opening and there is secured under the frame 27 a flanged sheet metal strip 29 to which the lining cloth 30 for the roof at each side of the opening is attached. The arrangement of the runners 26 in the grooves in the water-check frame allows for the necessary rising and falling movement of the rear edge of the panel as it moves longitudinally.

Figure 14:
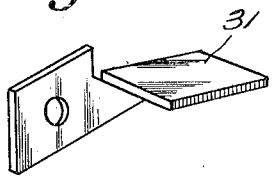
Figure 14 is a perspective view of one of the ramps for raising the rear edge of the panel.

In this case the raising of the rear edge of the panel as it reaches the closed position may be effected by the engagement of the runners 26 with sheet metal ramps 31 of the form shown in Figure 14 secured to the cantrails 28.

Figure 13:
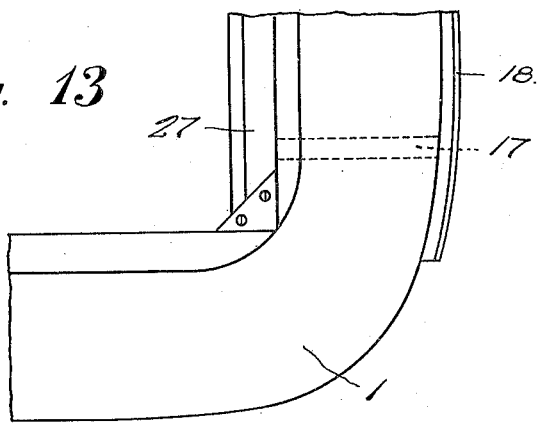
Figure 13 is a plan of one rear corner of the roof.

The water-check frame 27 is carried to the rear of the roof opening at each side as shown in the plan of one rear corner of the roof in Figure 13.

Figure 15:
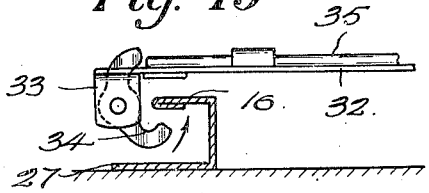
Figure 15 is a fragmentary section showing a convenient form of locking device for the sliding panel.

Any convenient form of locking device for the panel 2 may be employed but a preferred construction is shown diagrammatically in Figure 15. In this arrangement a metal strip 32 secured to the front cross-member of the panel has at each end a cranked portion 33 in which is pivotally mounted a locking catch 34 of bell-crank form. The upper end of this catch is adapted to be forced outwardly by a sliding bar 35 operated from a central control and the lower end of the catch is forced upwardly to engage the flange of the strip 16 and hold the panel tightly in position. When the catch is released it permits sufficient free upward movement of the panel to allow the panel to rise over the flanged strip 16 across the front of the roof opening.

The modified arrangement of sliding panel illustrated in Figure 16 is designed to give the effect of a flush fitting panel externally without any vertical movement of the panel being apparent from the inside of the vehicle.

The panel in this case is formed in two parts namely the upper panel 36 which when closed lies flush with the upper surface of the roof, and the lower or base panel 37 which is of plywood or similar material.

The base panel carries the rear drip channel 38 and a sealing strip 39 for engagement with the cover 3, and the base panel is slidably guided by means of felt-lined sliders 40 on the side flanges 16 of the water-check frame 27, so that it has a plain horizontal sliding movement.

The base panel and the upper panel are secured together at their front ends but are not connected together at their rear ends so that the rear edge of the upper panel can be raised relative to the base panel. Secured to the underside of the upper panel on each side near its rear edge is a striking plate 41 adapted to engage, as the panel approaches the closed position, with an inclined ramp 42 to raise the rear edge of the upper panel into a position substantially flush with the front edge of the cover 3. Thus the panel is made flush-fitting externally without any vertical movement of the panel visible from the inside of the vehicle. In the opening movement of the panel the connection between the upper and base portions of the panel at their front ends forces down the rear edge of the upper panel as it rides off the ramps so that it can slide freely under the cover 3.

I claim:

1. An opening roof for vehicles comprising an opening in the front part of the roof, a canopy covering the rear part of the roof, and a longitudinally slidable panel for covering the opening in the front part of the roof, said panel consisting of a base part sliding in horizontal guides extending below the canopy and an upper part secured to the base part adjacent to its front edge and free at its rear edge, and fixed means, automatically functioning with the continuous sliding of the panels, for raising the rear edge of said upper part of the panel, independently of the base, flush with the canopy when closed and for optionally lowering it to allow the panel to slide under the canopy, the base part of the panel remaining in the same plane whether open or closed.

2. An opening roof for vehicles comprising an opening in the front part of the roof, a canopy covering the rear part of the roof, a longitudinally sliding panel for covering said opening or optionally sliding beneath the canopy, water check troughs embodying guides, having outwardly extended horizontal flanges for said panel arranged along the sides of the said opening, pivoted, hooked members carried by said panel, and a central control for operating said hooked members to cause them to engage the said flanges from below anywhere in their length and to arrest and hold the panel at any point of its travel.

3. An opening roof for vehicles comprising an opening in the front part of the roof, a canopy covering the rear part of the roof, a longitudinally sliding panel for covering said opening in the front part of the roof, guides for the rear edge of the panel fixed at their rear ends and being free at their front ends and resiliently depressible to allow vertical movement of said rear edge to permit it to slide under the canopy, and fixed, rigid, inclined ramps with which said rear edge of the panel engages as it reaches the closed position, in a continuous forward movement, to bring its rear edge up in contact with and flush with the front edge of the canopy and off which said rear edge rides in a continuous backward movement as the panel starts to open to allow the panel to slide under the canopy.

WILLIAM HENRY BISHOP.